United States Patent
Lee et al.

(10) Patent No.: US 6,304,983 B1
(45) Date of Patent: Oct. 16, 2001

(54) CHECKPOINT LOGGING WITHOUT CHECKPOINT DISPLAY DEVICE AVAILABILITY

(75) Inventors: Van Hoa Lee, Cedar Park; David Lee Randall, Leander, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,917

(22) Filed: Sep. 30, 1998

(51) Int. Cl.$^7$ ....................................... G06F 11/00
(52) U.S. Cl. ............................... 714/48; 712/228
(58) Field of Search ................... 714/48, 9, 30; 713/1, 2, 100; 711/102, 103

(56) References Cited

U.S. PATENT DOCUMENTS 6,032,265 * 2/2000 Oguro et al. .

OTHER PUBLICATIONS

Checkpoint Register, J. A. Wetzel, IBM Technical Disclosure Bulletin, vol. 27, No. 4A, Sep. 1984, pp. 2231–2232.

Method to Utilize ROM–Based Power–on–Self–Test Code in Manufacturing Test, M.N. Day, J.T. Hanna, G. Morris and J. Zimmerman, IBM Technical Disclosure Bulletin, vol. 29, No. 3, Aug. 1986, pp. 1255–1257.

* cited by examiner

*Primary Examiner*—Gopal C. Ray
(74) *Attorney, Agent, or Firm*—Leslie A. VanLeeuwen; Bracewell & Patterson, L.L.P.

(57) ABSTRACT

A processor register is reserved by early firmware code to be employed for checkpoint logging or for storing diagnostic information at the time of failure before a checkpoint display device, usually contained within an I/O subsystem, is initialized. Early firmware codes are usually written in assembly language and the firmware of the present invention dedicates a processor register for logging checkpoint information. If a machine fails before any checkpoint, or point of failure, is displayed by a checkpoint display device, a dedicated processor register has logged any checkpoint or diagnostic information. The error information relating to the failure is obtained from the dedicated register through JTAG (Joint Task Action Group) scanning utilizing a processor debugging tool.

13 Claims, 4 Drawing Sheets

CHECKPOINT LOGGING WITHOUT CHECKPOINT DISPLAY DEVICE AVAILABILITY

BACKGROUND OF THE INVENTION

1. Technical Field:

The present invention relates in general to data processing system testing and in particular to testing during startup or power-on of the data processing system. Still more particularly, the present invention relates to recording startup error data that is pertinent to system failure which would otherwise be unavailable for analysis.

2. Description of the Related Art:

Data processing systems utilize a set of routines stored in a read only memory ("ROM") that tests various system components during startup to determine if they are operating and connected properly. The routines are originally employed during the manufacturing process. If problems are detected, the data processing system user is alerted, usually by a display device indicating the error that occurred. If the routines, referred to as power-on self test ("POST"), are successful control is passed to the system's bootstrap loader which resides in the system's ROM.

"Boot" firmware is ROM-based software that controls a computer within a data processing system from the time it is turned on until the primary operating system receives control of the data processing system. Firmware is a term that describes microcode (software routines) stored in ROM. Instructions, generally low-level, are written in code as software, programmed into system ROM and then become part of the hardware in the actual data processing system. The combination of the stored microcode and hardware is termed "firmware."

The main function of boot firmware is to initialize the hardware and then boot (load and execute) the primary operating system of a data processing system (also referred to as a computer). Secondary functions include testing hardware, managing hardware configuration information and providing tools for debugging in case of faulty hardware or software.

As a computer is being manufactured, tests are performed regularly while the computer passes down the manufacturing line. In the manufacturing process, during early firmware execution (also known as initial program loading or "IPL"), right after power on or Power-on-Reset, the Input/Output ("I/O") subsystem is not configured.

Checkpoint is a term that usually applies to a sequence of instructions in a computer program that allows recording and identification of various errors that occur during startup. Checkpoints in power-on self test code are commonly utilized to aid in the diagnosis of system failure during the IPL process. Generally, the implication is that there is enough of the data processing system operating to get to a checkpoint register or device so the point of failure can be ascertained. But the checkpoint register is almost always in the I/O subsystem, requiring that most of the system be operational to display causes of errors (non-responsive components, wrong or defective connections). Additionally, the I/O subsystem is usually not configured right after power-on. As a result, a checkpoint display device may be unavailable and errors which cause a failure may not be displayed. If a system failed but was unable to display a POST checkpoint, one might have to replace a processor card, memory, I/O cards or motherboard before isolating the cause of failure. Therefore, when some hardware problems occur early in the manufacturing line, diagnostic information for debugging a problem that has gone unrecorded is severely limited.

Referring to FIG. 3, a process for detecting checkpoints in a motherboard manufacturing operation, is depicted. The process begins with step 300, which illustrates power applied to a motherboard on a manufacturing line. The power is applied to determine whether there are defects or errors in software or hardware on the motherboard. The process proceeds to step 302, which illustrates initializing the system onboard the motherboard and testing hardware and software applications. The process continues to step 304, which depicts a determination of whether an error checkpoint has occurred during startup. If no checkpoint was detected, the process proceeds to step 306, which illustrates continuing the manufacturing process.

If an error checkpoint is detected, the process instead proceeds to step 308, which depicts a determination of whether or not a checkpoint display device is connected (initialized). If not, the process proceeds to step 312, which illustrates manual replacement of components. The process then proceeds to step 300, which depicts the system being powered on to retest the motherboard with the suspected defective component replaced. If the checkpoint display device is initialized, the process continues instead from step 308 to step 310, which depicts the operator running diagnostic tests or a manual error analysis. The error is corrected and the process proceeds to step 306.

As indicated previously, non-availability of a checkpoint display device increases cost and manufacturing time by requiring manual detection and correction of errors that occur early in the startup process. It would be desirable therefore, to provide a logging feature that is built into the computer to store checkpoint information early in the startup process, before the I/O checkpoint display device becomes ready for use. The checkpoint diagnostic information would then be available to aid in a debugging process.

SUMMARY OF THE INVENTION

It is therefore one object of the present invention to determine early checkpoint information for a computer.

It is another object of the present invention to extend the coverage of the available checkpoint data in the system.

It is a further object of the present invention to provide storage within the data processing system to log the checkpoint information for later retrieval.

It is yet another object of the present invention to utilize the checkpoint information to aid in the debugging process.

The foregoing objects are achieved as is now described. A processor register is reserved by early firmware code to be employed for checkpoint logging or for storing diagnostic information at the time of failure before a checkpoint display device, usually contained within an I/O subsystem, is initialized. Early firmware codes are usually written in assembly language and the firmware of the present invention dedicates a processor register for logging checkpoint information. If a machine fails before any checkpoint, or point of failure, is displayed by a checkpoint display device, a dedicated processor register has logged any checkpoint or diagnostic information. The error information relating to the failure is obtained from the dedicated register through JTAG (Joint Task Action Group) scanning utilizing a processor debugging tool.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
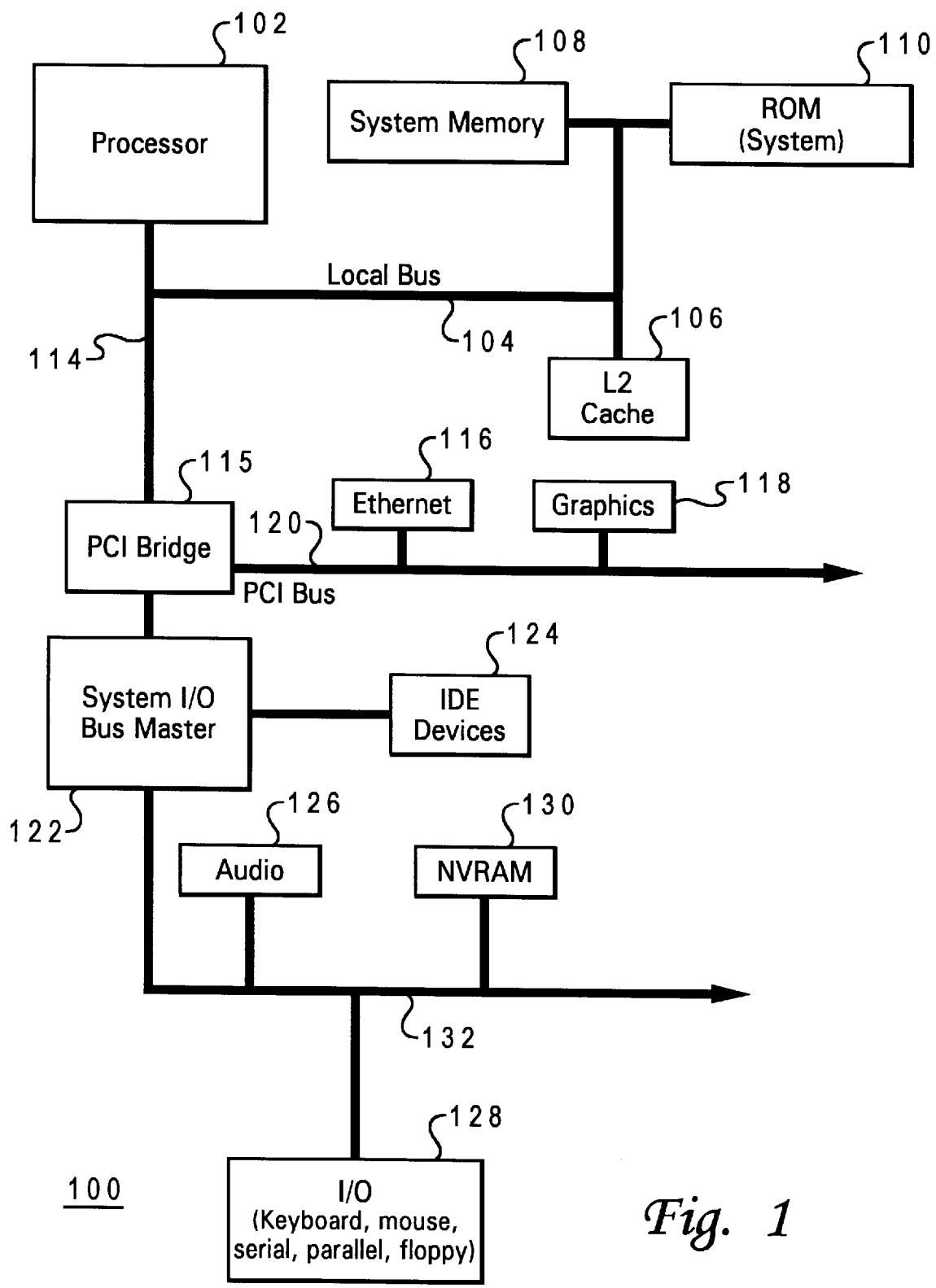
FIG. 1 depicts a high-level block diagram of a computer in which a preferred embodiment of the present invention may be implemented.

With reference now to the figures, and in particular with reference to FIG. 1, a high-level diagram of a motherboard utilized in a data processing system in which a preferred embodiment of the present invention may be implemented, is depicted. Motherboard 100 includes a processor 102, which may be a PowerPC™ processor available from International Business Machines Corporation of Armonk, N.Y. Processor 102 is connected to an L2 Cache 106 which is utilized to stage data to and from processor 102 at reduced access latency. L2 Cache 106 is connected in turn to Local Bus 104, which is also connected, in the embodiment depicted, to System Memory 108, and ROM (system) 110.

Peripheral Component Interconnect bus ("PCI") 120 is also connected, via PCI Bridge 115, to System Bus 114 to which multiple expansion cards, including ethernet card 116, may be connected. Ethernet card 116 may be utilized for connecting data processing system (not shown) and motherboard 100 to a local area network (LAN). Graphics card 118 provides a connection for a display device (not shown). System I/O-bus Master 122 provides control for IDE (IDE) disk drives (controller electronics in disk drive) and I/O (Input/Output) devices. I/O devices 128, such as a keyboard, a mouse, disk drives and serial and parallel ports may be connected to I/O bus 132, which in turn is connected to PCI Bridge 115, which in turn is connected to PCI Bus 120 and to system bus 114. Additionally, NVRAM (Non-volatile Random Access Memory) 130, is connected to the I/O bus 132 and thus to system bus 114.

The operation of data processing systems utilizing a motherboard of the type depicted in FIG. 1 is well known in the art. Program information comprising instructions and/or data is stored in non-volatile memory 130 and may be selectively copied into system memory 108 once motherboard 100 is powered on. Processor 102 executes instructions within such program information and generates text or graphical information for presentation on a display device connected via graphics card 118, where the information may be viewed by a user.

Figure 1A:
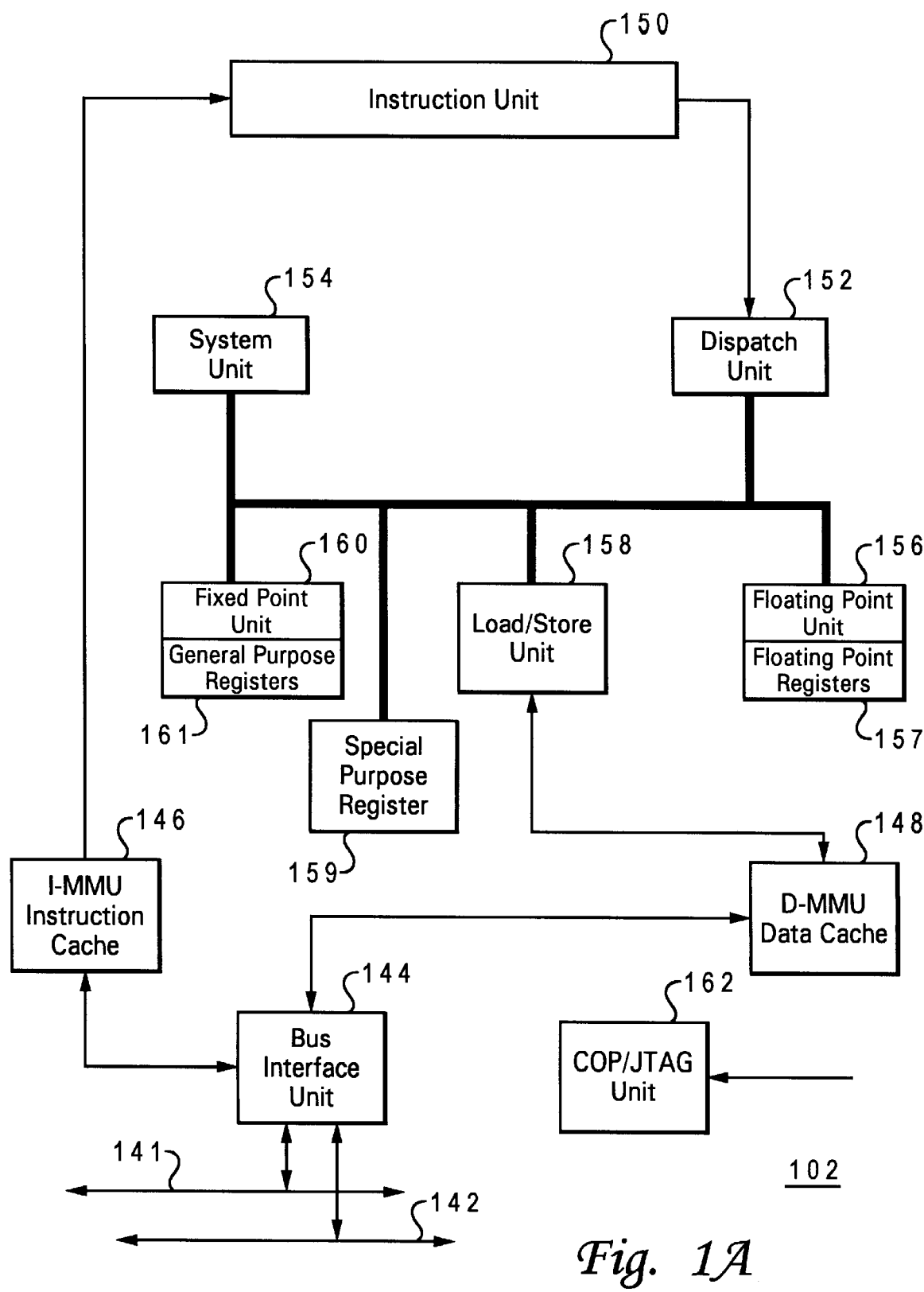
FIG. 1A is a high-level block diagram of a processor in accordance with a preferred embodiment of the present invention.

Referring to FIG. 1A, a high-level block diagram of a processor in which a preferred embodiment of the present invention may be implemented, is illustrated. Processor 102 includes various units, registers, buffers, memories and other sections, all of which are formed by integrated circuitry.

Processor 102 includes level one (L1) instruction and data caches 146 and 148, respectively, each having an associated memory management unit ("I-MMU" and "D-MMU"). As shown in FIG. 1A, processor 102 is connected to system address bus 141 and system data bus 142 via bus interface unit 144. Instructions are retrieved from system memory (not shown) and transmitted to processor 102 through bus interface unit 144 and are stored in instruction cache 146, while data retrieved through bus interface unit 144 is stored in data cache 148. Instructions are fetched as needed from instruction cache 146 by instruction unit 150. Instruction unit 150 includes (but does not necessarily show) an instruction queue, dispatch unit, branch unit and logic for performing functions associated with the individual units within instruction unit 150.

Dispatch unit 152 transmits instructions as appropriate to execution units such as system unit 154, floating point unit 156, load/store unit 158 or Fixed point unit/General Purpose Registers 160. System unit 154 performs special register transfer and other system instructions. Integer, or "fixed-point" unit 160 performs add, subtract, multiply, divide, shift or rotate operations on integer or general purpose registers 161. Floating point unit 156 performs single precision and/or double precision multiply/add operations, retrieving operands from and storing results in floating point registers 157. Special purpose register 159 is a non-dedicated register for general operating system use.

Load/store unit 158 loads instruction operands from data cache 148 into general purpose registers 161 or floating point registers 157 as needed, and stores instructions results, when available from general purpose or floating point registers, 161 or 157, into data cache 148. Common on-chip processor ("COP") and joint test action group ("JTAG") unit 162 provides a serial interface to the system for performing boundary scan interconnect tests.

The architecture depicted in FIG. 1A is provided solely for the purpose of illustrating and explaining the present invention, and is not meant to imply any architectural limitations. Those skilled in the art will recognize that many variations are possible. Processor 102 may include, for example, multiple integer and floating point execution units to increase processing throughput. All such variations are within the spirit and scope of the present invention.

The present invention may be employed in the architecture as indicated in FIGS. 1 and 1A to determine failure checkpoints prior to availability of a display device. The present invention, as employed in a manufacturing line, utilizes modified firmware to dedicate a register within a processor to record and retain a log of at least one checkpoint that may occur during startup. If a checkpoint code were an eight bit entity and the dedicated register was a 32 or 64 bit register, then multiple checkpoints could be stored in the register.

System 100 may fail during startup before a display device (not shown) is available to record errors that occur. Generally, a display device is connected to the I/O subsystem and is normally not available during the early stages of startup. The present invention detects and logs any checkpoint that occurs during startup to register 159 located within processor 102. A checkpoint log is retrieved by scanning JTAG interface 162 with a debug tool. Additionally, the checkpoint may also be logged into any other device (system memory 108 controller , PCI bridge 115 controller, etc.) on the motherboard 100 that is available during startup, has a register available during startup and has a JTAG interface. The checkpoint log would be retrieved by scanning the JTAG interface.

If a checkpoint display device is available to record checkpoints, the present invention mirrors, or writes, the checkpoint data to the display device and register 159. After retrieving a checkpoint log, diagnostics are run or manual error analysis is performed to determine and correct the error that caused the failure.

Figure 2:
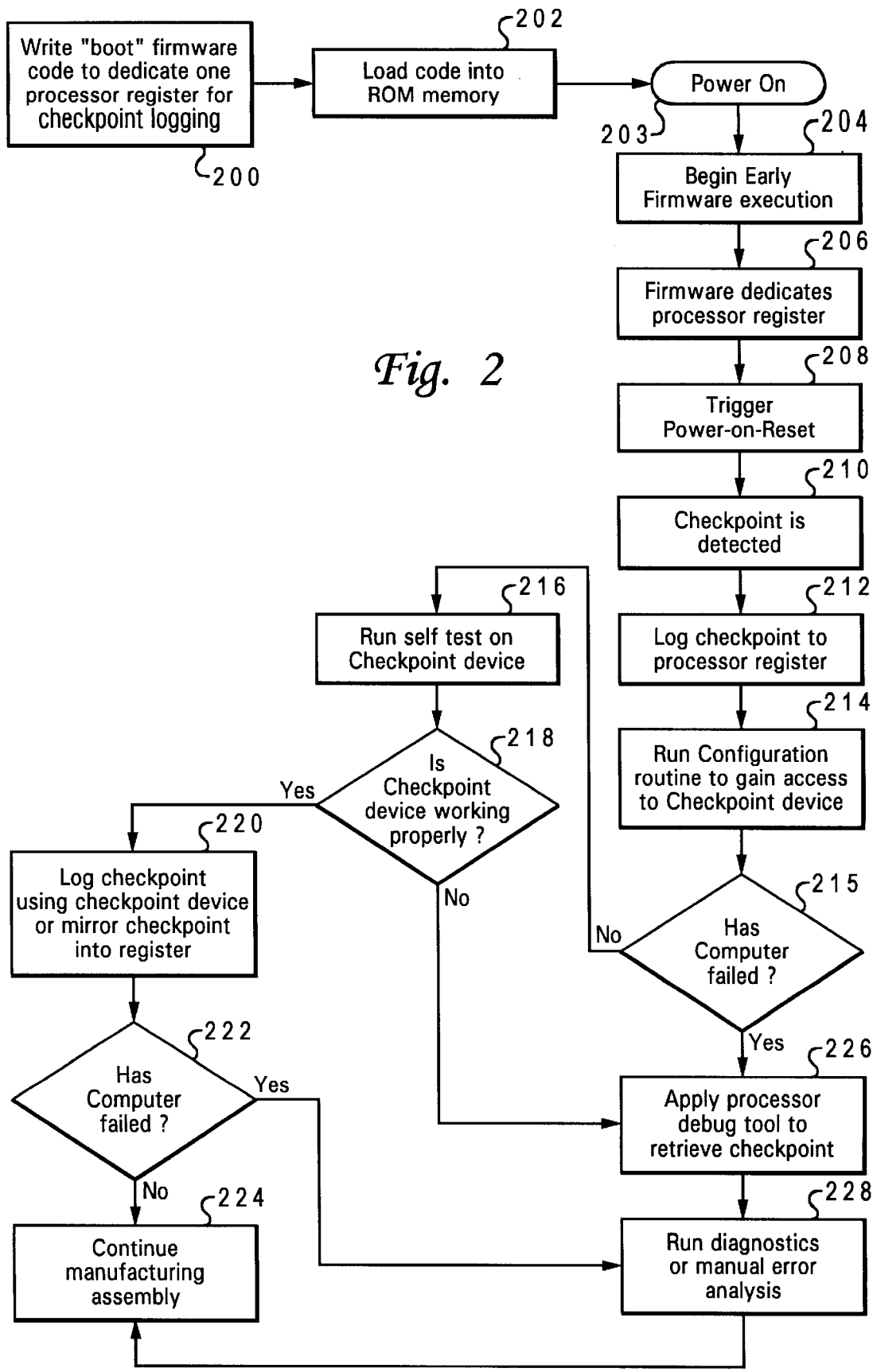
FIG. 2 is a high-level flow chart of the process for logging early checkpoints without a checkpoint display device in accordance with a preferred embodiment of the present invention.
Figure 3:
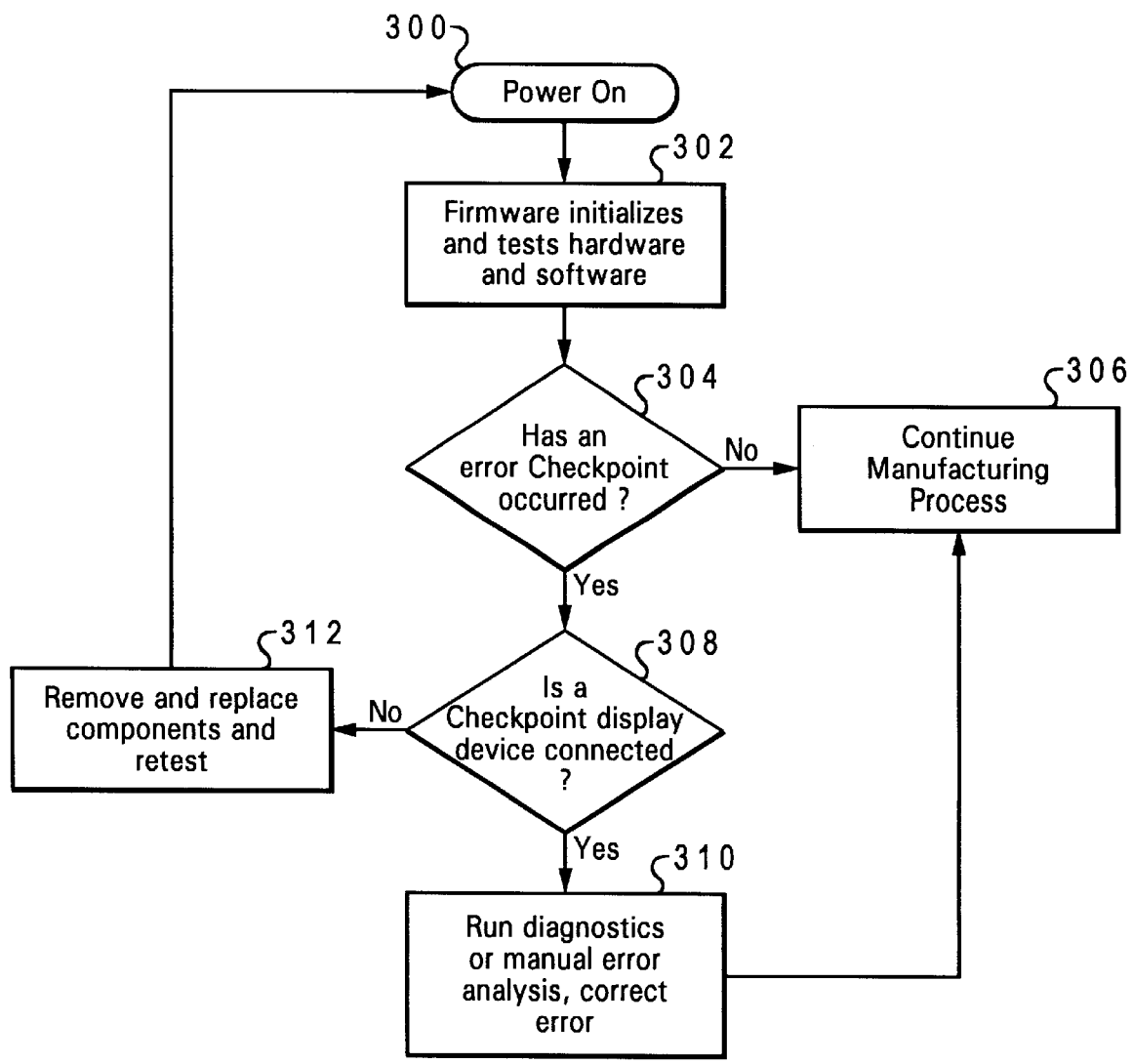
FIG. 3 depicts a process for detecting checkpoints in a motherboard manufacturing operation.

Referring to FIG. 2, a high-level flow chart of the process for logging early checkpoints without a checkpoint display device in accordance with the present invention,is illustrated. The process begins with step 200, which depicts code written to dedicate at least one processor register to record and retain a log of checkpoints that occur prior to initializing a display device. The process continues to step 202, which illustrates loading the code for reserving the processor register into the Read Only Memory ("ROM") on the motherboard being manufactured.

The process passes to step 203, which depicts applying power to the motherboard. The step next passes to step 204, which illustrates boot firmware loading into the system memory from ROM and beginning the early steps of the firmware execution. The process then proceeds to step 206, which illustrates the ROM, in combination with the programmed microcode, dedicating a specific register onboard the processor for storing a checkpoint log. The process next passes to step 208, which depicts the motherboard being re-set by triggering the Power-on-Reset function onboard the motherboard.

The process proceeds next to step 210, which illustrates detection of a checkpoint. The process continues to step 212, which depicts the checkpoint detection being logged onto the dedicated processor register. The process then passes to step 214, which illustrates running a configuration routine, to gain access to checkpoint display device. The process then passes to step 215, which illustrates a determination of whether the motherboard/computer has failed. If there is no failure detected, the process continues to step 216, which depicts running a self-test on the checkpoint display device. The process then proceeds to step 218, which illustrates a determination of whether the checkpoint display device is working properly. If the display is not working properly, the process proceeds to step 226, which depicts manual application of a processor debug tool to retrieve a logged checkpoint utilizing the JTAG interface.

Returning to step 218, if the checkpoint display device is working properly, the process proceeds instead to step 220, which illustrates logging the checkpoint using the checkpoint display device. In the alternative, the checkpoint may be loaded to the designated register and the checkpoint may be read directly. The process continues to step 222, which depicts a determination of whether the computer/motherboard has failed. If the computer/motherboard has not failed, the process passes to step 224, which illustrates continuation of the manufacturing process. If the computer has failed, the process instead passes to step 228, which depicts manually running a diagnostic or manual error analysis by accessing the dedicated register through the JTAG interface unit via a processor debugging tool.

Returning to step 215, if the computer motherboard fails, the process proceeds instead to step 226, which illustrates applying a processor debug tool to JTAG interface to retrieve a logged checkpoint through the JTAG interface. The process continues to step 228, which depicts running a diagnostics procedure or performing a manual error analysis. The process then proceeds to step 224, which illustrates continuing the manufacturing assembly after correcting the errors.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for retaining a checkpoint log prior to availability of a checkpoint display device, comprising the steps of:

programming a ROM on a computer motherboard to initiate checkpoint logging during startup;

reserving a selected processor register for logging occurrences of checkpoints; and logging said checkpoints in said processor register.

2. The method of claim 1, wherein programming said ROM on a computer motherboard for checkpoint logging during startup, further comprises:

loading a program into said ROM; and executing said program during startup.

3. The method of claim 2, further comprising:

determining said processor register is not available for logging said checkpoints;

reserving a second register within another component, having a Joint Task Action Group (JTAG) interface, on said motherboard for logging occurrences of checkpoints; and logging said checkpoints in said second register.

4. The method of claim 1, wherein logging said checkpoints in said processor register, further comprises:

writing said checkpoint occurrences to said processor register.

5. A data processing system having means for retaining a checkpoint log prior to availability of a display device, comprising:

means for programming a ROM on a computer motherboard to initiate checkpoint logging during startup;

means for reserving a selected processor register for logging said checkpoints;

means for logging occurrences of checkpoints in said processor register; and means for retrieving a checkpoint log.

6. The data processing system of claim 5, wherein means for programming said ROM on a computer motherboard to initiate checkpoint logging during startup, further comprises:

means for loading a program into said ROM; and means for executing said program during startup.

7. The data processing system of claim 5, further comprises:

means for determining said processor register is not available for logging said checkpoints;

means for reserving a second register within another component, having a Joint Task Action Group (JTAG) interface, on said motherboard for logging said checkpoints; and means for logging said checkpoints in said second register.

8. The data processing system of claim 5, wherein means for logging said checkpoints in said processor register, further comprises:

means for writing said checkpoint occurrences to said processor register.

9. A computer program product within a computer-readable medium having instructions for retaining a checkpoint log prior to availability of a display device, comprising:

instructions within said computer-readable medium for programming a ROM on a computer to initiate checkpoint logging during startup;

instructions within said computer-readable medium for reserving a processor register for logging occurrences of checkpoints; and instructions within said computer-readable medium for logging said checkpoints in said processor register.

10. The computer program product of claim 9, wherein instructions for programming said ROM on a computer motherboard for checkpoint logging, further comprises:

instructions within said computer-readable medium for loading a program into said ROM; and instructions within said computer-readable medium for executing said program during startup.

11. The computer program product of claim 10, further comprising:

instructions within said computer-readable medium for determining said processor register is not available for logging said checkpoints;

instructions within said computer-readable medium for reserving a second register within another component, having a Joint Task Action Group (JTAG) interface, on said motherboard for logging said checkpoints; and instructions within said computer-readable medium for logging said checkpoints in said second register.

12. The computer program product of claim 9, further comprising:

instructions within said computer-readable medium for loading checkpoint data into said register.

13. The computer program product of claim 9, wherein instructions for logging said checkpoints in said processor register, further comprises:

instructions within said computer-readable medium for writing said checkpoint occurrences to said processor register.

* * * * *

UNITED STATES PATENT AND TRADEMARK OFFICE
CERTIFICATE OF CORRECTION

PATENT NO. : 6,304,983 B1
DATED : October 16, 2001
INVENTOR(S) : Van H. Lee et al.

It is certified that error appears in the above-identified patent and that said Letters Patent is hereby corrected as shown below:

Column 7,
Line 19, please add -- motherboard -- after the word "computer"

Signed and Sealed this

Seventh Day of May, 2002

Attest:

Attesting Officer

JAMES E. ROGAN
Director of the United States Patent and Trademark Office